Figure 1:
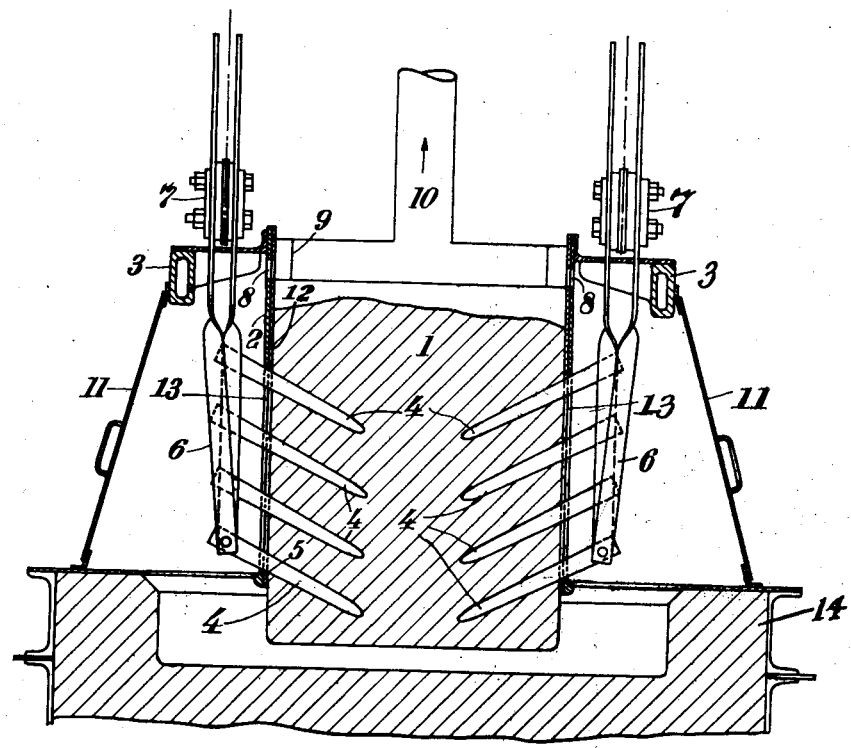

May 23, 1939.    M. O. SEM    2,159,183
SELF-BAKING ELECTRODE
Filed July 1, 1937

Inventor:
Mathias Ovrom Sem
By Attorneys

Patented May 23, 1939

2,159,183

UNITED STATES PATENT OFFICE 2,159,183

SELF-BAKING ELECTRODE

Mathias Ovrom Sem, Oslo, Norway, assignor to Det norske Aktieselskab for Elektrokemisk Industri, Oslo, Norway Application July 1, 1937, Serial No. 151,369
In Norway July 8, 1936

7 Claims. (Cl. 13—19)

This invention relates to selfbaking electrodes, commonly called Söderberg electrodes.

The primary object of the invention is the construction of a selfbaking electrode in which the adhesion of the electrode to the casing employed in its formation does not prevent the controlled movement of the electrode through the electrode casing as the electrode is burned off at the bottom in use; but on the contrary, permits the electrode to be lowered through its casing while in use and thereby makes possible the avoidance of the melting of the casing at the bottom on the burning away of the electrode with the destruction of the casing attendant thereto and in certain instances contamination of the melt.

Other objects of the invention will be apparent as this description proceeds.

The procedure usually employed in the operation of selfbaking electrodes as at present constructed consists in permitting the metallic casing serving as a mold and armature for the electrode to melt down into the electric furnace in which the electrode is used, which casing is thus consumed together with the electrode. Experiments have been made in the use of a permanent casing through which the electrode may slide into the furnace without destruction of the casing and without the casing passing into the melt. In the practical application of such permanent casings such difficulties have been encountered that prior to the invention hereof permanent casings have not proved successful in commercial production.

By continued work on this problem applicant has eventually arrived at a structure which in many cases may be applied in commercial production with considerable advantage. Broadly speaking, in applicant's electrode the casing acts as a permanent mold for the formation of the electrode and the supply of current to the electrode mass is independent of the casing, so that in the baking of the electrode no current will pass from the electrode casing directly to the unbaked electrode mass within the casing.

Where the current passes from the casing to the electrode mass a sudden coking of the binding agents of the electrode mass in contact with the casing occurs, which causes such adherence between the electrode casing and the electrode that the baked electrode cannot in use pass through the casing.

If, however, care is taken to supply the electric current to the electrode independently of the casing, the baking of the electrode will altogether take place from the inside and during the baking the electrode mass will contract.

Provided a casing is employed which is rigid and not pressed against the electrode from outside, the connection between electrode casing and mass will gradually loosen as the baking proceeds. This is not only effected by the said contraction of the electrode mass but also because the casing which is warmer in its lower than in its upper part expands during the heating. When used in a hot electric furnace the casing will therefore during operation be slightly conical with the wide end downwards even if it is cylindrical in cold condition. This effect may if desired be further improved upon by making the casing wider at its lower than at its upper end. Usually this is however not necessary.

The practical application of the invention may be modified according to the conditions in the electric furnace in which the electrode is employed and the electrode construction must be adjusted to suit these conditions. The invention is especially suitable in connection with electrodes which are used in aluminium furnaces in which special iron contacts are employed penetrating into the electrode from its outside. The invention may also be used in connection with contacts arranged vertically in the electrode mass inside the electrode casing. Special contacts may also be arranged in the electrode mass registering with the inside of the casing and receiving the current from the casing without development of so much heat that the binding agents of the mass are subjected to an intense coking.

Figure 2:
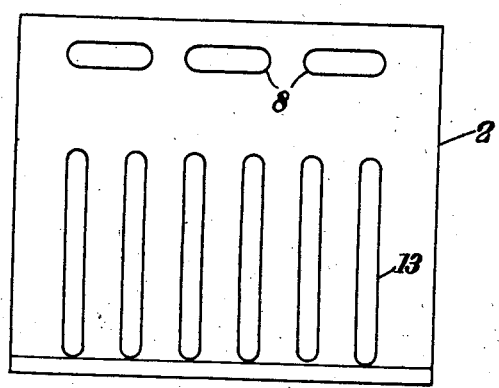

In the drawing forming a part hereof, I have shown the invention as applied to a closed furnace particularly applicable as an aluminum furnace. It should be understood, however, that this is purely for illustrative purposes and no undue limitation should be deduced therefrom. In the drawing, Figure 1 is a vertical cross-section of the electrode and furnace, the lower part of the furnace being broken away and certain parts of the structure being shown in full lines;

Fig. 2 is an elevation of the portion of the electrode casing straightened into a plane for ready illustration.

Reference being had more particularly to Fig. 1, the electrode 1 is illustrated as being formed in an iron casing or mold 2 which is supported on a fixed frame 3 suitably positioned in respect to the electrode 1 and furnace 14. The casing 2 is provided with a series of vertical slots 13 through which extend contact studs 4. These contact studs are illustrated as arranged in vertical tiers, one tier for each slot 13 in the casing, and the bottom contact stud in each tier is supported as its outer end by cable bars 6 which latter are in turn attached to a suspension frame 7, the bars 6 serving the double purpose of supporting the contact studs and of supplying current thereto.

The contact studs 4 are positioned midway in the slots 13, and the slots 13 have a width in excess of the diameter of the studs. Electrical contact between the studs and casing is thereby avoided, except at the time when the lower row of studs has reached the limit of their travel and rests on the casing at the bottom of the slots. This position is illustrated in Fig. 1. Here, however, the baking of the electrode has progressed to such a stage that coking which would interfere with the movement of the electrode through the casing does not occur; and the electrical connection of the contact studs with the electrode is much better than with the casing.

The suspension frame 7 may be raised or lowered in known way, by means of spindles or jacks or other well known devices common in the art but not illustrated in the drawing. Except in the position illustrated in Fig. 1, the electrode 1 in its travel through the casing 2 is supported in large part by its adhesion to the casing, the frictional contact between electrode and casing being such that about 50% of the load is supported in this way, the remainder obviously being carried by the contact studs 4 which are connected with the bars 6.

During operation the electrode is slowly lowered relatively to the bath surface as its lower end is consumed. This is effected by lowering the suspension frame 7. When in this way the frame at last approaches its lowest position the contact studs must be so arranged that the lower row of studs will rest on the electrode casing at the bottom of the slots 13 as indicated by the reference numeral 5, and travel of the electrode through its casing is thereupon arrested. The contact bars 6 may then be disconnected from the lower row of studs 4, the suspension frame and contact bars 6 raised, the bars 6 connected with the row of studs next higher up, the lower row of studs 4 thereafter transferred to a position at the top of the slots 13, and the travel of the electrode through its casing reestablished. The nuts connecting the frame 7 with the vertical cable bars may suitably be supplied with springs (not shown) thus forming a sliding contact allowing the supply of current to be maintained even while the frame is lifted to its highest position.

The drawing indicates a closed furnace in which a collecting tube for the oven gas is placed inside the electrode mold. The gas passes through holes 8 into a gas passage 9 at the inside of the electrode mold. This passage is connected with an exhaust pipe 10. The hood surrounding the electrode is provided with a suitable number of doors 11.

The drawing shows a type of electrode casing provided with a lining of aluminium 12 apertured in like manner as the casing 2. This lining possesses the advantage that the electrode mass will more easily slide against an aluminium plate than against an iron plate.

During the starting of the oven while the electrode is crude and unbaked it is difficult to make the electrode slide in the mold. One may therefore during the first period let the aluminium lining slide together with the mass. As soon as the electrode is baked and conditions are normal the aluminium lining will as a rule stop by itself. The electrode mass will slide inside the aluminium lining and this may therefore be attached to the casing 2.

To prevent the unbaked electrode mass from more or less breaking out through the vertical slots 13 for the contacts 4 the slots may suitably be covered with an aluminium plate (not shown) which moves downwards together with the contacts, as it is important that the electrode mass does not get any chance to penetrate through the slots so far that it will adhere to the bottom of the slots 13 during the lowering of the electrode. It is, however, of course possible to vary the mode of application in many ways.

The foregoing detailed description and illustrations have been given for clearness of understanding and no undue limitations should be deduced therefrom, but the appended claims should be construed as broadly as possible in view of the prior art.

I claim:

1. Arrangement for selfbaking electrodes where the electrode mass slides in a permanent metallic mold said mold having slots for contacts being inserted from outside into the electrode, said slots being of sufficient length to allow lowering of electrode and contacts during operation.

2. Arrangement for selfbaking electrodes where the electrode mass slides in a permanent metallic mold said mold having slots for contacts being inserted from outside into the electrode, said slots being closed at the lower end in such a way that the downward movement of the electrode is stopped until the lower set of contacts has been removed.

3. Arrangement for selfbaking electrode where the electrode mass slides in a permanent metallic mold, said mold having slots for contacts being inserted from outside into the electrode, said contacts serving for suspension of the electrode.

4. The combination of a selfbaking electrode, a fixedly mounted electrode casing therefor which comprises a mold for the electrode and in respect to which the electrode is relatively movable in a downward direction, said casing being provided with slots positioned lengthwise in the direction of movement of the electrode through the casing, electrical contact studs extending through said slots into the interior of the electrode, the construction of the said slots and contact studs being such that as the electrode is lowered through its casing there is no electrical connection between the studs and the casing and current led to the said contact studs passes to the interior of the electrode for baking the same and such that the contact studs are movable downwardly through the slots.

5. The combination of a selfbaking electrode, a fixedly mounted electrode casing therefor which comprises a mold for the electrode and in respect to which the electrode is relatively movable in a downward direction, said casing being provided with slots positioned lengthwise in the direction of movement of the electrode through the casing, rows of removable electrical contact studs extending through said slots into the interior of the electrode, the construction of the said slots and contact studs being such that as the electrode is lowered through its casing there is no electrical connection between the studs and the casing and current led to the said contact studs passes to the interior of the electrode for baking the same and such that the contact studs are movable downwardly through the slots, the lower walls of the slots comprising supports for the bottom row of contact studs on reaching the said walls in their downward travel and through the said contact studs supporting the electrode while additional contact studs are mounted in the electrode above.

6. The combination of a selfbaking electrode, an electrode casing therefor which comprises a mold for the electrode, said casing being provided with an inner lining, the casing being relatively movable in respect to the electrode and the lining being held to the electrode by adhesion of the electrode mass during the initial stage of the baking of the electrode and during said baking being relatively movable in respect to the casing, the casing and its lining being relatively fixed after the initial stage of the baking of the electrode and said electrode being relatively movable in respect to the lining thereafter, the casing and its lining being provided with registering slots positioned lengthwise in the direction of movement of the electrode through the casing, electrical contact studs extending through said slots into the interior of the electrode, the construction of the said slots and contact studs being such that as the electrode is lowered through its casing there is no electrical connection between the studs and the casing and current led to the said contact studs passes to the interior of the electrode for baking the same and such that the contact studs move downwardly through the slots.

7. The combination with a hooded electric furnace of a selfbaking electrode, an electrode casing therefore fixedly mounted in respect to the furnace and comprising a mold for the electrode, the electrode and casing being relatively movable so as to permit the electrode to be moved toward the charge to compensate for the burning away of the electrode at the charge, said casing being provided with vertical slots, electrical contact studs extending into the interior of the electrode through and movable lengthwise of said slots, the construction of the said slots and contact studs being such that as the electrode is lowered through its casing there is no electrical connection between the contact studs and the casing and current led to the said contact studs passes to the interior of the electrode for baking the same, said casing being provided near its top with gas vent apertures positioned within the hood of the furnace, and means cooperating with the said gas vent apertures for conducting gas passing therethrough away from the furnace.

MATHIAS OVROM SEM.